(12) United States Patent
Horning et al.

(10) Patent No.: US 8,363,303 B2
(45) Date of Patent: Jan. 29, 2013

(54) PHOTONIC STRUCTURES AND PHOTONIC DEVICES

(75) Inventors: Robert D. Horning, Savage, MN (US); Robert Compton, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 323 days.

(21) Appl. No.: 12/750,383

(22) Filed: Mar. 30, 2010

(65) Prior Publication Data

US 2011/0242638 A1 Oct. 6, 2011

(51) Int. Cl.
*G02B 26/00* (2006.01)

(52) U.S. Cl. .......... 359/290; 359/291; 359/321

(58) Field of Classification Search .......... 359/290, 359/291, 296, 321
See application file for complete search history.

(56) References Cited

U.S. PATENT DOCUMENTS

| | | | |
|---|---|---|---|
| 6,822,784 B2 * | 11/2004 | Fukshima et al. | 359/298 |
| 2003/0174993 A1 * | 9/2003 | Tomaru | 385/129 |
| 2004/0012840 A1 * | 1/2004 | Takiguchi et al. | 359/321 |
| 2004/0057472 A1 * | 3/2004 | Takiguchi et al. | 372/20 |
| 2009/0098468 A1 * | 4/2009 | Gaylord et al. | 430/5 |
| 2010/0001509 A1 * | 1/2010 | Whiteman | 283/91 |

OTHER PUBLICATIONS

QUALCOMM, Interferometric Modulator (IMOD) Technology Overview, Mirasol, IMOD Technology Overview, May 2008.

* cited by examiner

*Primary Examiner* — Thomas K Pham
*Assistant Examiner* — Vipin Patel
(74) *Attorney, Agent, or Firm* — Ingrassia Fisher & Lorenz, P.C.

(57) ABSTRACT

Photonic structures and photonic devices are provided. A photonic structure includes a three-dimensional photonic crystal and an actuator. The three-dimensional photonic crystal comprises an elastomeric, auxetic material and configured to provide a predetermined optical bandgap. The actuator is coupled to the three-dimensional photonic crystal and is configured to compress the three-dimensional photonic crystal. When the actuator compresses the three-dimensional photonic crystal, the three-dimensional photonic crystal shifts from reflecting light in a first wavelength range to light in a second wavelength range.

20 Claims, 5 Drawing Sheets

PHOTONIC STRUCTURES AND PHOTONIC DEVICES

TECHNICAL FIELD

The inventive subject matter generally relates to displayed images, and more particularly relates to photonic structures and photonic devices.

BACKGROUND

Many transmissive displays, such as liquid crystal displays (LCDs), include a backlight to enhance user visibility of the display under various conditions by illuminating the display. Although the overall structure and configuration may vary, a typical transmissive display includes a display and a plurality of light sources that are placed behind the display. The light sources, when appropriately energized, emit light and illuminate the display. Various types of light source backlights, for example, incandescent light, electroluminescent (EL) light, cold cathode fluorescent lamp (CCFL), hot cathode fluorescent lamp (HCFL), and light emitting diode (LED) backlights, just to name a few, have been developed and used.

Although the aforementioned displays are sufficient for displaying images under most circumstances, they may be improved. For example, in some instances, the backlight may operate in a reduced power mode for various off-nominal operating conditions, such as for thermal management purposes and/or for battery management purposes. However, because backlights are typically designed to produce substantially uniform luminance for an entire display region, each of the light sources of the backlight may be energized even though the entire display may not be needed during the reduced power mode. As a result, the display may produce images that appear dimmer than necessary.

In another example, some backlit displays may operate less efficiently in certain lighting conditions. In particular, the brightness level of the backlit display may be relatively high when used in bright sunlit conditions. Because the brightness level of the display impacts the amount of power required to operate the device and power consumption affects the length of time the device can operate on battery power, a backlit display employed in bright sunlight may have a relatively short operational time and a high electrical load placed on a vehicle power supply system. In aircraft/spacecraft applications, cooling systems may add unwanted additional weight to the vehicle.

Hence, there is a need for devices that are capable of displaying images that can operate using a minimal amount of power. Additionally, it is desirable for the device to display images that can be viewed under a variety of lighting conditions, including bright sunlight conditions. Moreover, it is desirable for the device to be relatively inexpensive and simple to fabricate. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Photonic structures and photonic devices are provided.

In an embodiment, by way of example only, a photonic structure includes a three-dimensional photonic crystal and an actuator. The three-dimensional photonic crystal comprises an elastomeric, auxetic material and configured to provide a predetermined optical bandgap. The actuator is coupled to the three-dimensional photonic crystal and is configured to compress the three-dimensional photonic crystal. When the actuator compresses the three-dimensional photonic crystal, the three-dimensional photonic crystal shifts from reflecting light in a first wavelength range to light in a second wavelength range.

In another embodiment, by way of example only, a photonic device is provided and includes a substrate and a photonic structure. The photonic structure is disposed over the substrate and includes an array of scales. Each scale of the array of scales comprises a three-dimensional photonic crystal comprising an elastomeric, auxetic material having a lattice structure capable of being compressed and configured to provide a predetermined optical bandgap, and an actuator coupled to the three-dimensional photonic crystal and configured to compress the three-dimensional photonic crystal. When the actuator compresses the three-dimensional photonic crystal, the three-dimensional photonic crystal shifts from reflecting light in a first wavelength range to light in a second wavelength range.

BRIEF DESCRIPTION OF THE DRAWINGS

The inventive subject matter will hereinafter be described in conjunction with the following drawing figures, wherein like numerals denote like elements.

DETAILED DESCRIPTION

Figure 1:
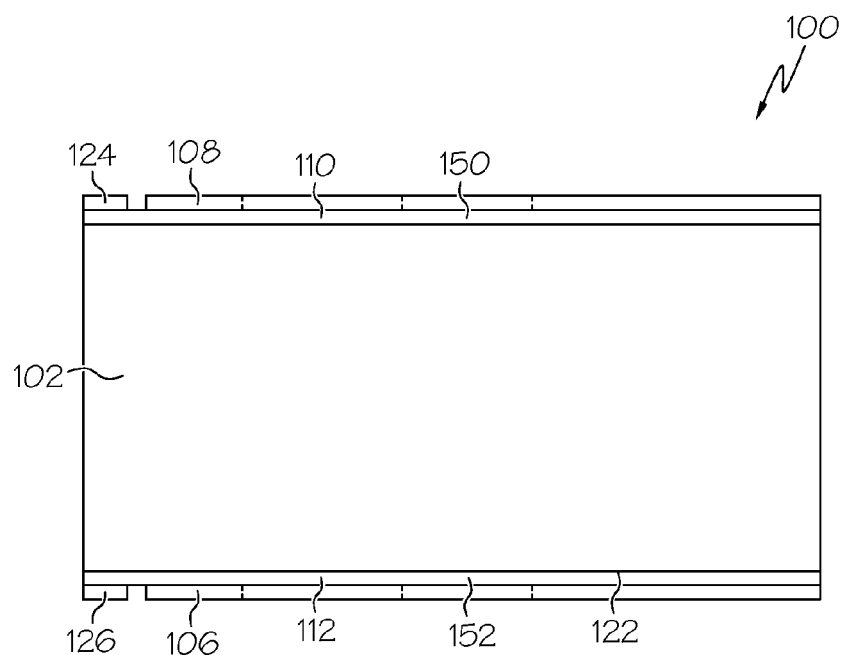
FIG. 1 is a cross-sectional side view of a simplified illustration of a photonic structure, according to an embodiment.

The following detailed description is merely exemplary in nature and is not intended to limit the inventive subject matter or the application and uses of the inventive subject matter. Certain terminology may also be used in the following description for the purpose of reference only, and thus are not intended to be limiting. For example, terms such as "top", "bottom", "upper", and "lower" may refer to directions in the drawings to which reference is made and/or the orientation or location of portions of the component within a consistent but arbitrary frame of reference which is made clear by reference to the text and the associated drawings describing the component under discussion. Furthermore, there is no intention to be bound by any theory presented in the preceding background or the following detailed description.

Generally, the inventive subject matter provides a photonic structure that can be implemented into a device and that can reflect light in a desired spectrum. For example, the photonic structure may be configured to reflect light in the visible spectrum (e.g., in a wavelength range of about 400 nanometers (nm) to about 700 nm). In other examples, the photonic structure can be configured to reflect light in another desired spectrum outside of or overlapping with the visible spectrum. According to another embodiment, the photonic structure is configured to be capable of reflecting light in various infrared bands. In an example, short wavelength infrared or near infrared wavelengths from about 700 nm to about 1.4 um are reflected. In another embodiment, wavelengths from about 1.4 um to 3 microns are reflected. In still other embodiments, medium range infrared wavelengths from about 3 um to about 8 um or longer wavelength infrared wavelengths from about 8 um to about 15 um are reflected.

The photonic structure is further configured to yield substantial uniformity (e.g., >95% uniformity of reflectivity at any wavelength within a desired spectrum) over a display area and over a wide viewing angle (e.g., a maximum angle at which a display can be viewed with acceptable visual performance of at least about an 80° half angle). As used herein, the term "half angle" may be defined as an angle between normal to a display and a viewing direction. As used herein, the term "viewing direction" is defined as the line of sight between a center of the display and the viewer. In the case where the half angle is about 80°, a total cone of acceptable viewing would be about 160°.

In an embodiment, the photonic structure includes an actuator coupled to a three-dimensional photonic crystal comprising an elastomeric material. The actuator causes the dimensions of the photonic structure to change, which causes the reflected and transmitted spectra to change. In other words, actuation causes the three-dimensional photonic crystal lattice to shift from reflecting a first wavelength of light to reflecting a second wavelength.

The three-dimensional photonic crystal comprises an auxetic material, which can be actuated to thereby to provide a predetermined optical bandgap. As used herein, the term "auxetic material" is defined as a material having a Negative Poisson's Ratio when compressed by the actuator (referred to herein as a "Negative Poisson's Ratio lattice structure"). As used herein, the term "Poisson's Ratio" is defined as a ratio of a lateral dimension increase to a vertical dimension decrease when actuation stress is applied in the vertical direction. A Poisson's ratio is negative when a vertical dimension decrease also results in a lateral dimension decrease. By employing the auxetic material, the dimension of the photonic crystal lattice of the auxetic material changes substantially uniformly in all directions when actuated by the actuator, causing the reflected wavelength to change. As a result, the photonic structure may appear to an observer as changing from a first color or first image to a second color or second image, and a display in which the color shift is substantially the same over the wide viewing angle may be achieved. The photonic structure may be provided as a uniformly configured material capable of displaying a single color or image over a display area or an array of scales capable of displaying multiple colors or images on a display area. Thus, the photonic structure can be implemented into a variety of devices, including, but not limited to reflectors, displays, cloaking devices, spectroscopy apparatus, and other applications.

FIG. 1 is a cross-sectional side view of a simplified illustration of a photonic structure 100, according to an embodiment. The photonic structure 100 is configured to be a flexible, electrostatically tunable structure capable of changing from a first display having a first image or first color to a second display having a second image or second color, in response to actuation commands. In accordance with an embodiment, the photonic structure 100 includes a photonic crystal (PhC) 102, an actuator (e.g., top and bottom actuators 110, 112), an anti-reflective layer 106, and a diffractive layer 108. In an embodiment, a top side 120 of the photonic structure is located on the same side as the diffractive layer 108 and is configured to convey a visible output to the observer. An opposite, bottom side 122 of the photonic structure 100 may be configured to be disposed over a substrate (not shown) or other support device.

The PhC 102 is a flexible, three-dimensional structure having a refractive index that varies periodically along all three spatial directions (e.g., in an X-direction, a Y-direction orthogonal to the X-direction, and a Z-direction orthogonal to both the X- and Y-directions). The periodicity of the aforementioned variation is on an order of magnitude of the wavelength of the light that is to be reflected by the PhC 102. To provide the flexibility, the PhC 102 comprises a polymeric or elastomeric material. According to an embodiment, the elastomeric material begins as a photosensitive elastomer. Examples of suitable photosensitive elastomers include, but are not limited to photosensitive silicone rubber, and SU8. In other embodiments, one or more different elastomeric materials may be employed. In accordance with an embodiment, the elastomeric material may be altered to exhibit a predetermined optical and/or mechanical property. In such cases, the elastomeric material can be doped, filled or coated with another suitable material. For example, to stiffen the elastomeric material, another polymer, a ceramic or other material may be included. To modify the optical properties, the elastomeric material may be doped with a transparent material having a different index of refraction from the host polymer. To create electrical conductivity, the elastomeric material may be doped with a carbon or a metallic material.

As noted above, the PhC 102 is also configured to provide a predetermined optical bandgap. In an embodiment, the predetermined optical bandgap may be a substantially complete optical bandgap. As used herein, the term "substantially complete optical bandgap" is defined as an energy range over which ≦10% of a total number of photons can propagate within the photonic crystal, regardless of direction of entry into the photonic crystal. By having a substantially complete optical bandgap, light at the wavelengths within the predetermined energy range originating from any incident direction may be reflected from the PhC 102. In still another embodiment, the predetermined optical bandgap may be a nearly complete optical bandgap. As used herein, the term "nearly complete optical bandgap" is defined as an energy range over which ≦20% of a total number of photons can propagate within the photonic crystal, regardless of direction of entry into the photonic crystal. In yet other embodiments, the predetermined optical bandgap may be greater than 70% complete. In still yet other embodiments, the predetermined optical bandgap may be more or less complete than the aforementioned ranges. A normal incidence wavelength that can be reflected by the PhC 102 shifts by changing the periodicity of the photonic crystal lattice in the direction of the light-wave propagation. The Negative Poisson's Ratio lattice structure of the auxetic material causes the periodicity shift to be the same in all directions within the PhC 102, which in turn produces a uniform color shift over the wide viewing angle.

Figure 2:
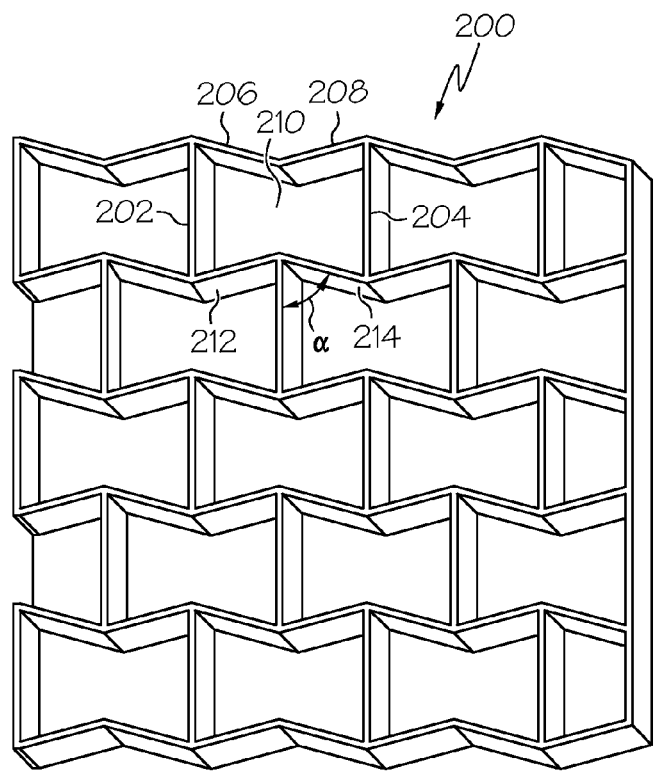
FIG. 2 is a simplified, two-dimensional view of cells of an auxetic material, according to an embodiment.

FIG. 2 is a simplified, two-dimensional view of cells 200 of an auxetic material, according to an embodiment. It will be appreciated that the auxetic material for use as part of the PhC 102 has a three-dimensional configuration and that the use of the two-dimensional view of the auxetic material in FIG. 2 is included to aid in understanding the structure of the three-dimensional auxetic material used in the PhC 102. In any case, the cells 200 comprise auxetic hexagons. In an embodiment, each cell 200 is depicted as including six sides 202, 204, 206, 208, 212, 214 defining an interior 210. Although the sides 202, 204, 206, 208, 212, 214 are shown as solid walls in the two dimensional view of FIG. 2, it will be appreciated in a three-dimensional model, the sides 202, 204, 206, 208, 212, 214 may be sticks of material connected to each other by balls at intersection points between at least two of the sticks. The intersection points are represented in FIG. 2 by intersections of the walls. In an embodiment, the sides 202, 204, 206, 208, 212, 214 comprise an elastomeric material similar to the elastomeric materials described above in conjunction with the PhC 102 (FIG. 1). The interior 210 may include a gas or a liquid. In an embodiment, the gas or liquid may be included to take advantage of swelling and deswelling effects in the elastomeric material of the sides 202, 204, 206, 208, 212, 214 due to changes in pneumatic or hydraulic pressure. In another embodiment, absorption or adsorption of the gas or liquid will cause the cells 200 to swell. In another embodiment, an index-contrasting liquid may be included to change the index of refraction contrast within the lattice defined by the cells 200. For example, the interior 210 may be filled with air, an inert gas, water, oil or another material. In accordance with an embodiment, each cell 200 has two substantially parallel sides 202, 204, a first pair of angled sides 206, 208 angling inwardly toward the interior 210 of the cell 200, and a second air of angled sides 212, 214 opposite the first pair of angled sides 206, 208 angling inwardly toward the interior 210 of the cell 200. The sides 202, 204, 206, 208, 212, 214 define a hexagonal, bowtie shape.

In an embodiment, each side 202, 204, 206, 208, 212, 214 has a length in a range of about 20 nm to about 300 nm. In another embodiment, the walls may be longer or shorter than the aforementioned range. In an embodiment, a length of the parallel sides 202, 204 may be in a range of about 50 nm to about 400 nm, a length between the parallel side walls 202, 204 may be in a range of about 50 nm to about 400 nm, and an angle α between the angled sides 206, 208 may be in a range of about 130° to about 155°. In other embodiments, the dimension of the cells 200 may be greater or less than the aforementioned ranges. Although fifteen complete cells 200 are shown in FIG. 2, more cells 200 may be included to form the re-entrant honeycomb pattern in other embodiments.

According to an embodiment, by arranging the cells 200 in a pattern including auxetic hexagons, the auxetic material is capable of deforming to a dimension strain of 50% or more in a direction of light propagation. Additionally, as the dimension strain is applied, a shift of the wavelength peaks of the light reflected by the strained NPR lattice scales correspondingly. Moreover, the air or liquid filled interior 210 of the cell 200 provides index contrast from the host elastomeric material, to provide periodicity on a sub-micron length scale to thereby allow for partial or substantially complete photonic bandgaps.

It will be appreciated that although the plurality of auxetic hexagons is provided as an example of an auxetic material, other patterns that can form three-dimensional auxetic materials may alternatively be employed for the PhC 102.

Returning to FIG. 1, tunability of the PhC 102 is controlled by the actuator 110, 112. In an embodiment, the actuator 110, 112 is configured to cause the dimension strain of 50% or more on the PhC 102 allowing the PhC 102 to exhibit the aforementioned wavelength shift over a majority of the visible spectrum. Thus, the actuator 110, 112 is configured to apply pressure against top and bottom sides 120, 122 of the PhC 102 to compress and expand the PhC 102. Accordingly, when the actuator 110, 112 is actuated, the actuator 110, 112 compresses the PhC 102 into a compressed configuration, and when the actuator 110, 112 is relaxed, the PhC 102 can expand to a relaxed configuration.

According to an embodiment, the actuator 110, 112 includes a first actuator 110 and a second actuator 112 disposed one each on two opposing sides of the PhC 102. In accordance with an embodiment, the actuators 110, 112 comprise an electrostatic pressure actuator and comprise layers or coatings of material capable of being charged with a voltage from a voltage source. The material is selected so that when each actuator 110, 112 receives a different charge (e.g., one actuator 110, 112 receives a positive charge and the other actuator 110, 112 receives a negative charge), the actuators 110, 112 become attracted to each other. In an embodiment, the actuators 110, 112 may comprise a metal, conductive polymer or other electrically conductive material. In another embodiment, one of the actuators 110 or 112 could be a thin film electret material, such as amorphous fluoropolymers including Teflon® AF available through E.I. du Pont de Nemours and Company of Delaware, or polyparaxylylene plastic such as Parylene HT® available through Specialty Coating Systems, Inc. of Indianapolis, Ind.

In accordance with some embodiments, the actuators 110, 112 may comprise segmented electrodes, stretchable electrodes and/or contacts. For example, the actuators 110, 112 are each continuous sheets that are disposed on opposing sides of the PhC 102. In another embodiment, the actuators 110, 112 extend over particular sections over particular corresponding surfaces of the PhC 102. In an example, the actuators 110, 112 include a plurality of segments (e.g., segments 150, 152 shown in phantom) that are disposed at discrete locations over the PhC 102. In such case, the actuators devices 110, 112 on each opposing sides of the PhC 102 may be aligned with each other on either side of the PhC 102 to provide substantially uniform compression of the PhC 102 in response to the voltage. In any case, the actuators 110, 112 are substantially transparent (e.g., >95% of light travels through the actuators 110, 112) or are semi-transparent (e.g., about 50% to about 95% of light travels through the actuators 110, 112). According to an embodiment, the actuators 110, 112 are in electrical communication with corresponding interconnects 124, 126 configured to electrically couple the devices 110, 112 to a voltage source (not shown).

Each actuator 110, 112 may have a thickness in a range of about 100 nm to about 1000 nm. In other embodiments, the actuators 110, 112 may be thicker or thinner than the aforementioned range. In still another embodiment, one actuator 110, 112 may be thicker than the other actuator 110, 112.

As mentioned above, the interconnects 124, 126 provide electrical communication between the actuators 110, 112 and the voltage source. In an embodiment, the interconnects 124, 126 are formed over the actuators 110, 112. In an embodiment, the interconnects 124, 126 comprise doped elastomeric material. For example, the interconnects 124, 126 may comprise one or more of the elastomeric material mentioned above in relation to the PhC 102 doped with carbon or other particles. In another embodiment, the interconnects 124, 126 may comprise a conductive material, including but not limited to a conductive polymer. According to an embodiment, the interconnects 124, 126 may have a thickness in a range of about 1000 nm to about 10 microns. In another embodiment, the interconnects 124, 126 may be thicker or thinner than the aforementioned range. In accordance with another embodiment, the interconnects 124, 126 may be substantially similar (e.g., ±0.5 microns) in thickness. In another embodiment, one interconnects 124, 126 may be thicker than the other.

Reflection by one of the actuators 110, 112 of wavelengths that are transmitted by the PhC 102 may convey an undesired white background against the visible spectrum conveyed to the observer. To prevent such an effect, the antireflective layer 106 is included in the photonic structure 100. In an embodiment, the antireflective layer 106 is formed proximate the actuator 112. Although not depicted, in another embodiment, the antireflective layer 106 is formed between the PhC 102 and the actuator 112. In an embodiment, the antireflective layer 106 comprises a nanostructured polymer material deposited as closely spaced cones that effectively blur an interface between the PhC 102 and an adjacent medium, such as air or the actuator 112. For example, the antireflective layer 106 may comprise doped portions of the PhC 102. In such an embodiment, those portions of the PhC 102 may be doped with carbon particles, metals, inks or other doping materials.

The antireflective layer 106 may have a thickness in a range of about 100 nm to about 1000 nm, in an embodiment. In other embodiments, the antireflective layer 106 may be thicker or thinner than the aforementioned range. According to an embodiment, the antireflective layer 106 may extend across an entirety of one side of the PhC 102. In another embodiment, only a portion of the PhC 102 may include the antireflective layer 106.

According to another embodiment, the diffractive layer 108 is included. If included, the diffractive layer 108 can improve a viewing angle provided to the observer. In an embodiment, the diffractive layer 108 is disposed over a top side 120 of the photonic structure 100. For example, the diffractive layer 108 may be formed over the actuator 110 closest to the top side 120 of the photonic structure 100. In an embodiment, the diffractive layer 108 may comprise doped portions of the PhC 102. In such an embodiment, those portions of the PhC 102 may be doped with carbon particles, metals, inks or other doping materials.

The diffractive layer 108 may have a thickness in a range of about 100 nm to about 1000 nm, in an embodiment. In other embodiments, the diffractive layer 108 may be thicker or thinner than the aforementioned range. According to an embodiment, the diffractive layer 108 may extend across an entirety of one side of the PhC 102. In another embodiment, only a portion of the PhC 102 may include the diffractive layer 108. In still other embodiments, the diffractive layer 108 may not be beneficial and thus, may be omitted.

Figure 3:
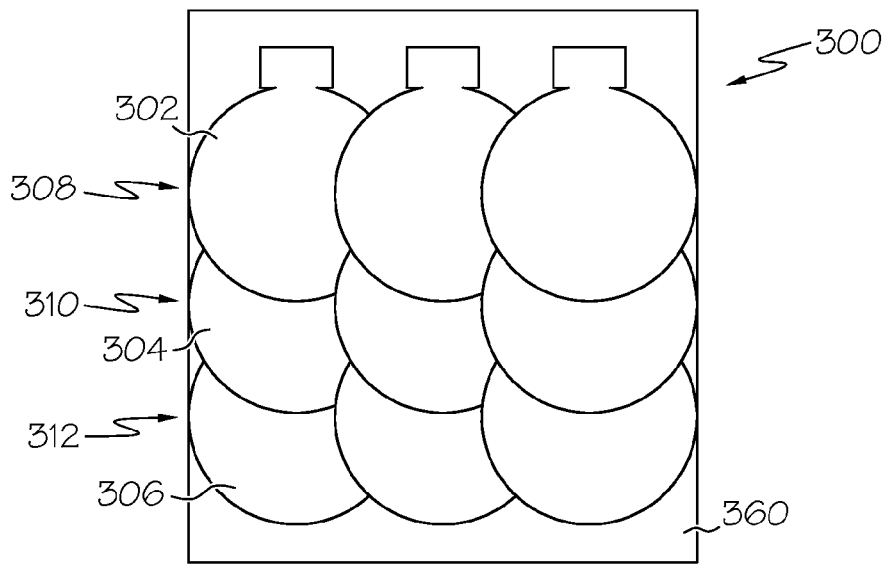
FIG. 3 is a top view of a photonic device, according to an embodiment.

In an embodiment, the photonic structure 100 may be implemented into a larger photonic device. For example, more than one photonic structure 100 may be placed together to form an array. FIG. 3 is a top view of a photonic device 300, according to an embodiment. Here, the photonic device 300 includes a substrate 360 and an array of scales 302, 304, 306 attached to the substrate 360. In an embodiment, the substrate 360 is flexible and comprises a flexible material such as a polymer sheet, in an embodiment. Suitable polymers include, but are not limited to polyimides, acrylics and polyester films. In another embodiment, the substrate 360 is a rigid material and comprises a rigid polymer plate or a semi-rigid structure. In an embodiment, the photonic device 300 is a relatively flexible material that may be employed to cover a variety of surfaces. Accordingly, the photonic device 300 may be cut into a form having a length and width as small as 1 cm by 1 cm or a sheet having a length and width of any size. In other embodiments, the form may have smaller or larger dimensions. In an embodiment, the form of the photonic device 300 is a sheet having edges cut into a polygon, such as a square, as show in FIG. 3. In other embodiments, the photonic device 300 may be cut into a circle or oval shape. In other embodiments, the photonic device 300 may be formed into a three-dimensional object may be a cube, a cylinder or another three-dimensional object. In any case, the shape of the photonic device 300 may be customized depending on a particular application in which the photonic structure 100 is to be employed in a variety of applications.

In an embodiment, the array of scales 302, 304, 306 is employed to exhibit a high degree of fault tolerance so that failure of one scale will not affect a total image perceived by a viewer. In this regard, the scales 302, 304, 306 may be relatively small. For example, each scale 302, 304, 306 may have a display area of about 100 microns by 100 microns. In other embodiments, the scales 302, 304, 306 may be larger or smaller. The scales 302, 304, 306 may be substantially uniformly sized, in an embodiment. In another embodiment, some scales 302, 304, 306 may be larger or smaller than others. Although each scale 302, 304, 306 is depicted as having a substantially circular display area, the display areas may be rectangular, lenticular, ovular, square, triangular or another shape in other embodiments.

According to an embodiment, a substantially 100% fill factor may be desired. In this regard, the array of scales 302, 304, 306 may be arranged in rows 308, 310, 312 and each scale 302, 304, 306 is individually tunable. According to an embodiment, a portion of each scale 302, 304, 306 overlaps or is overlapped by an adjacent scale. In an embodiment, a portion of each scale 302, 304, 306 in one row overlaps or is overlapped by an adjacent scale in a different row 302, 304, 306. For example, scales 302 in row 308 overlap scales 304 in row 310, and scales 306 in row 310 overlap scales 308 in row 312. According to another embodiment, scales in a single row overlap or are overlapped by an adjacent scale. In other embodiments, the scales are not arranged in rows, but still overlap adjacent scales. Although three rows 308, 310, 312 are shown in FIG. 3, more or fewer rows are included in other embodiments. The number of rows 308, 310, 312 may depend on the display area provided by each individual the scale 302, 304, 306. Although overlap of the scales 302, 304, 306 provides improved fill factor, some embodiments may include two or more scales in a single row that are spaced apart from each other.

Figure 4:
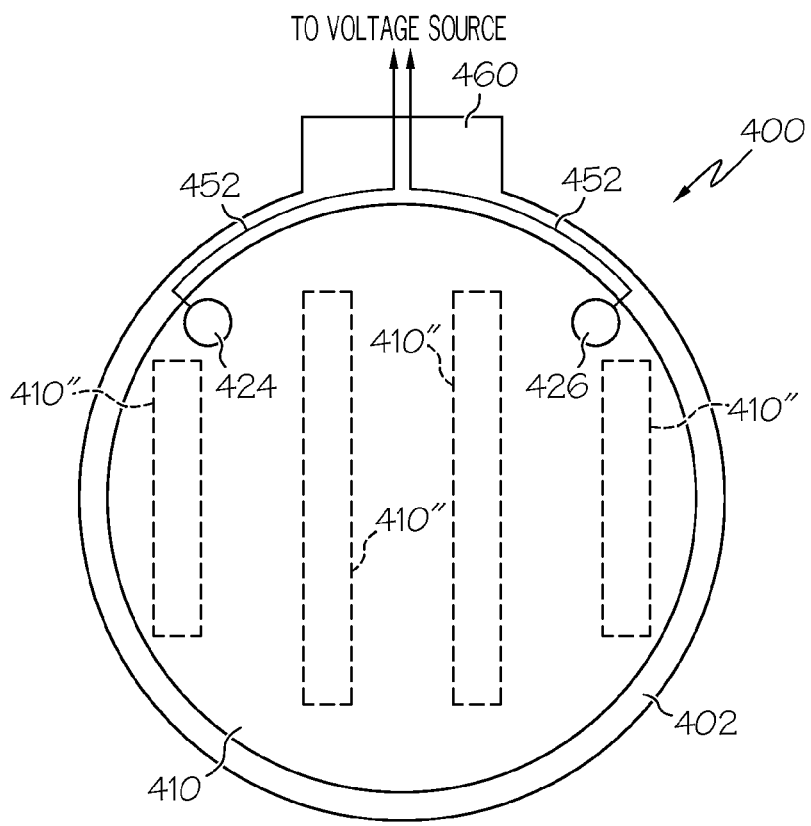
FIG. 4 is a top view of a scale, according to an embodiment.

In an embodiment, individual scales of the array reflect a pure spectral color, while combinations of closely-spaced scales can be addressed in combinations to produce any arbitrary mixed color. To achieve the aforementioned visual effects, each scale 302, 304, 306 is individually tunable. FIG. 4 is a top view of a scale 400, according to an embodiment. The scale 400 comprises a photonic structure that is configured in a manner similar to that of photonic structure 100 described above. In an embodiment, the scale 400 is circular and includes a photonic crystal (PhC) 402, actuators 410, interconnects 424, 426, and a stem 460. The PhC 402 is configured substantially similar to PhC 102 described above. In an embodiment, a top actuator 410 and a bottom actuator (not shown) opposite the top actuator 410 are disposed on either side of the PhC 402. The actuators 410 are configured substantially similar to actuators 110, 112 described above. In an embodiment, a plurality of top and bottom actuators (top device 410" shown in phantom) spaced apart from each other along the surface of the scale 400. In an embodiment, the actuators 410" may be a plurality of strips extending across both sides of the scale 400. In another embodiment, the actuators 410" comprise a plurality of segmented electrodes uniformly spaced apart from each other and disposed on each side of the scale 400. In still other embodiments, the actuators 410" are randomly spaced apart from each other.

The actuators 410, 410" electrically communicate with a voltage source (not shown) via interconnects 424, 426. The interconnects 424, 426 are configured in a manner substantially similar to that of interconnects 124, 126 in FIG. 1. In an embodiment, the interconnects 424, 426 may be located at two adjacent corners of the scale 400 as shown in FIG. 4. In another embodiment, the interconnects 424, 426 may be located on opposite corners of the scale 400. In still other embodiments in which the scale 400 is a different shape, the interconnects 424, 426 may be positioned in other areas of the scale 400. To provide electrical communication to the voltage source, the interconnects 424, 426 additionally extend along an edge portion of the scale 400 onto the stem 460, in an embodiment. In another embodiment, the interconnects 424, 426 extend along another portion of the scale 400. In any case, the stem 460 provides a single point connection between the scale 400 and the substrate 360 (FIG. 3) and provides an electrical interconnection path between the scale 400 and the voltage source. According to an embodiment, the stem 462 extends from an edge of the scale 400. In another embodiment, the stem 462 is a post extending from a bottom side of the scale 400.

Figure 5:
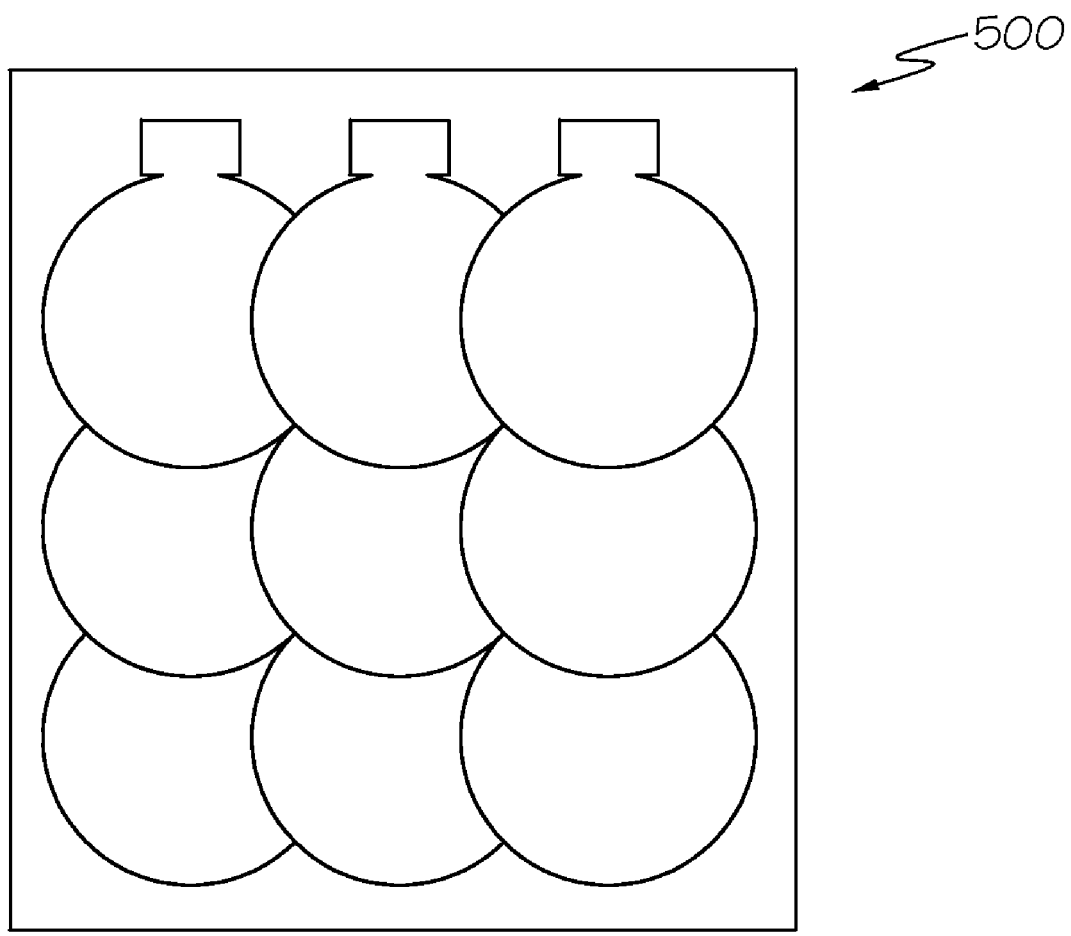
FIG. 5 is a top view of a photonic device, according to another embodiment.

To control actuation, a controller, processor or another device may be operatively coupled to each scale 402, 404, 406 via the stem 462 and/or the interconnects 424, 426. To provide individual tunability, leads for electrostatic actuation can be laid out so as to independently address each scale, producing changeable patterns. For example, FIG. 3 shows scales 302, 304, 306 in a relaxed configuration where the actuators have not been activated. In contrast, FIG. 5 is a top view of a photonic device 500, according to another embodiment. Here, the photonic device 500 is configured substantially similar to photonic device 300 of FIG. 3, except that voltage has been supplied to the photonic device 500 causing the device 500 to be actuated.

Figure 6:
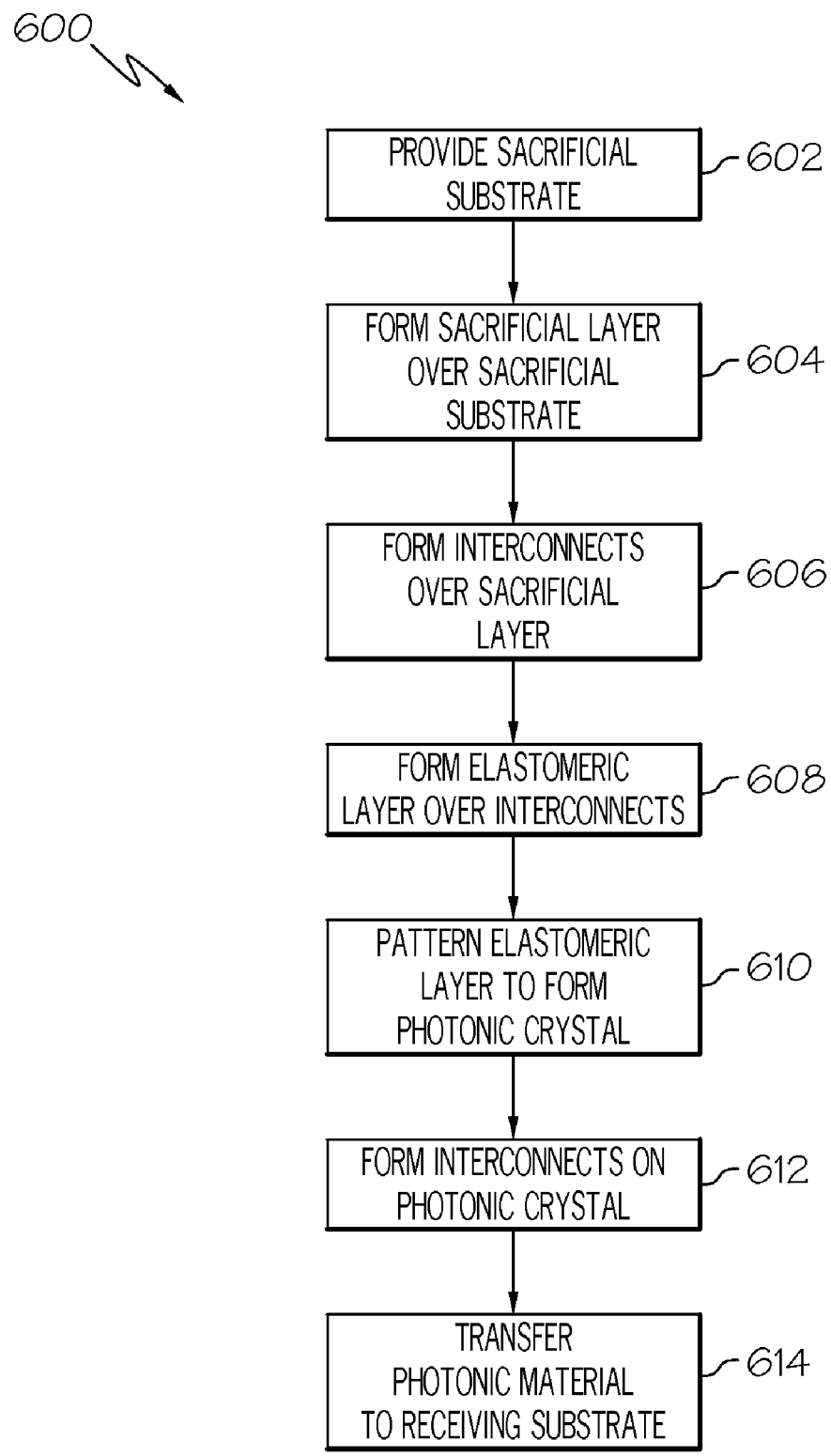
FIG. 6 is a flow diagram of a method of fabricating a photonic structure and device, according to an embodiment.

The photonic structures 100 and photonic devices 300, 500 described above may be fabricated using a variety of different techniques. FIG. 6 is a flow diagram of a method 600 of fabricating a photonic structure and device, and FIGS. 7-12 are simplified illustrations of steps of the method 600, according to an embodiment. In an embodiment, a sacrificial substrate is provided, step 602. The sacrificial substrate (e.g., sacrificial substrate 700 in FIG. 7) comprises material conventionally used as a support substrate in nanoscale and/or microscale fabrication processes and may comprise a polymer sheet, a silicon wafer, a glass wafer or another type of wafer typically employed as a sacrificial substrate.

Figure 7:
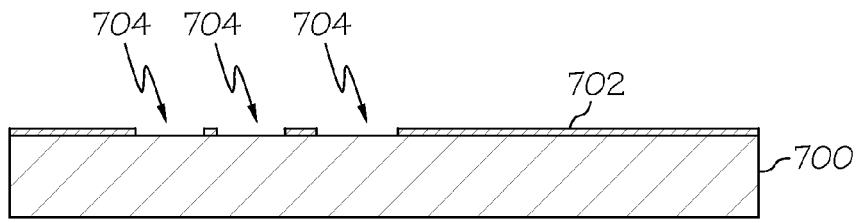
FIGS. 7-12 are simplified illustrations of various steps of the method of FIG. 6, according to an embodiment.

Next, a sacrificial layer is formed over the sacrificial substrate, step 604. In an embodiment, the sacrificial layer comprises easily removable metals or polymers, which are deposited on the sacrificial substrate. For example, metals such as aluminum, tungsten, titanium, chromium or other metallic materials may be employed. In another embodiment, polymers such as photoresist materials can be employed. The sacrificial layer may be formed to a thickness in a range of about 0.1 micron to about 10 microns. In this regard, deposition may be performed using any conventional thick film deposition technique, including but not limited to spin coating, spray coating or another deposition process. In another embodiment, the sacrificial layer may be thicker or thinner than the aforementioned range. The sacrificial layer is patterned to include openings, which will be used for the formation of electrical interconnects and for stems (e.g., stems 460) for anchoring. FIG. 7 shows a sacrificial substrate 700 including a sacrificial layer 702 having openings 704, according to an embodiment. In an embodiment, the sacrificial layer is patterned using conventional masking and etching processes. In another embodiment, direct printing techniques are used to deposit patterned sacrificial features.

Figure 8:
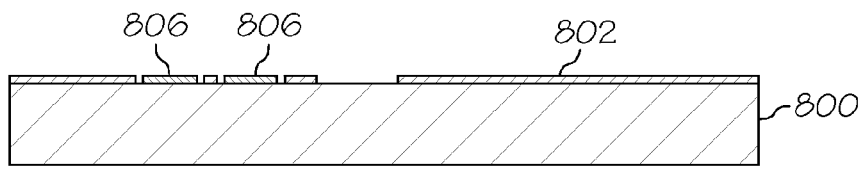

A first interconnect is formed over the sacrificial layer, step 606. In accordance with an embodiment, the first interconnect is formed from conductive material, such as metal. Hence, the conductive material is deposited over the sacrificial layer. The conductive material may be deposited to a thickness in a range of about 10 nm to about 1000 nm, in an embodiment. In other embodiments, the conductive material may be thicker or thinner than the aforementioned range. Deposition may be performed using any conventional thin film deposition technique, including but not limited to sol gel, molecular beam epitaxy, chemical deposition processes such as chemical vapor deposition, plasma enhanced chemical vapor deposition, plating, and the like, physical deposition processes, such as pulsed laser deposition, atomic layer deposition or another deposition process. The conductive material is patterned using masking and etching techniques to form suitable interconnects. FIG. 8 shows an embodiment of the first interconnects 806 formed over a sacrificial layer 802 on a sacrificial substrate 800. The first interconnect 806 may include one or more portions or may make up one or more interconnects.

Figure 9:
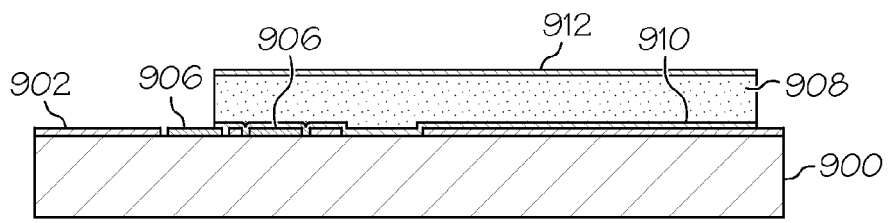

An elastomeric layer is formed over the first interconnect, step 608. The elastomeric layer comprises elastomeric material similar to one or more of the materials mentioned above in connection with the photonic crystal 102 (FIG. 1). The elastomeric layer may be deposited to a thickness in a range of about 1 micron to about 10 microns. In other embodiments, the elastomeric layer is thicker or thinner than the aforementioned range. Deposition may be performed using any conventional thick film deposition technique, including but not limited to spin coating, spray coating or another deposition process. FIG. 9 is a depiction of an elastomeric layer 908 formed over first interconnect 906, which are disposed over a sacrificial layer 902 on a sacrificial substrate 900, in an embodiment.

Portions of the elastomeric layer may be manipulated to form other desired features of the photonic structure, such as upper and lower conductive surface layers (e.g., layers 910, 912 in FIG. 9). In such case, desired portions of the elastomeric layer may be doped or otherwise treated for preparation of the conductive surface layers. Doping or other treatment may occur during the processes of depositing one or more layers over the interconnects and/or one or more of the final layers the elastomeric material. In an embodiment, the conductive surface layers may have a thickness in a range of about 10 nm to about 100 nm. In another embodiment, the doped layers may be thicker or thinner.

Figure 10:
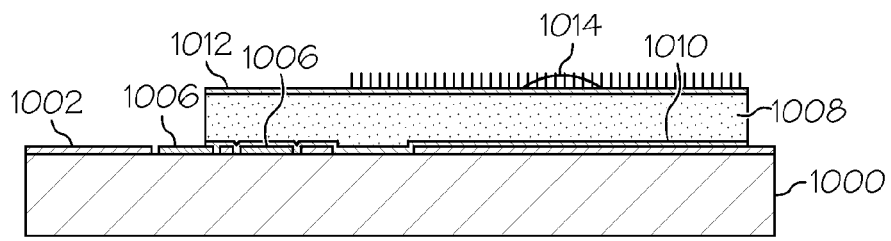

Next, the elastomeric layer is patterned to form a photonic crystal, step 610. FIG. 10 shows an elastomeric layer 1008 including a phase mask 1014 disposed thereover. The elastomeric layer 1008, shown in FIG. 10 as including optional upper and lower conductive surface layers 1010, 1012, is over a sacrificial layer 1002, interconnects 1006, and a sacrificial substrate 1000. The photonic crystal has properties similar to photonic crystal 102 described above and comprises an auxetic material having Negative Poisson's Ratio (NPR) lattice structure. In an embodiment, the NPR lattice structure is formed by a proximity field nanopatterning technique. The proximity field nanopatterning technique is an optical 3D nanofabrication technique that relies on contact mode exposures of thick, transparent layers of a photosensitive material through a conformable phase mask, where the phase mask has sub-wavelength features of relief embossed onto its surface. In a proximity field nanopatterning technique, a conformable phase mask (e.g., phase mask 1014 in FIG. 10) is formed over the elastomeric layer with sub-wavelength features of relief embossed onto its surface. A configuration of the conformable phase mask can be designed using a Genetic Algorithm technique, an adjoint method or another method.

For the Genetic Algorithm technique, a target exposure pattern representative of an auxetic material is identified and a phase mask to produce the target exposure pattern is formed. In an embodiment, a 3D periodic structure with a Negative Poisson's Ratio lattice structure and a substantially complete bandgap is defined as the target exposure pattern. A set of trial solutions, typically referred to in the art as "chromosomes", is also defined, and an exposure pattern for each chromosome is determined by simulation. A fitness of each chromosome is judged relative to the target exposure pattern. Chromosomes with the highest fitness are then combined and mutated to yield a new generation of trial solutions. Successive generations are simulated to yield successive chromosomes, also known in the art as "solutions", where each successive chromosome has increasing fitness relative to the target exposure pattern.

A gradient based approach known as the adjoint method is another way to identify a minimum in a multivariable function defined by a difference between the desired target pattern and a pattern produced by a trial solution. In contrast to the Genetic Algorithm method, the gradient based approach proceeds deterministically by calculation of partial derivatives of the minimum in the multivariable function with respect to small changes in the variables that define the phase mask. The solution iterates in a direction that minimizes the differences between the target pattern and the pattern produced by a current solution iteration.

In another example, the conformable phase mask design may include a three-dimensional pattern including auxetic hexagons, as described above in conjunction with FIG. 2, or another pattern capable of exhibiting characteristics of an auxetic material.

Figure 11:
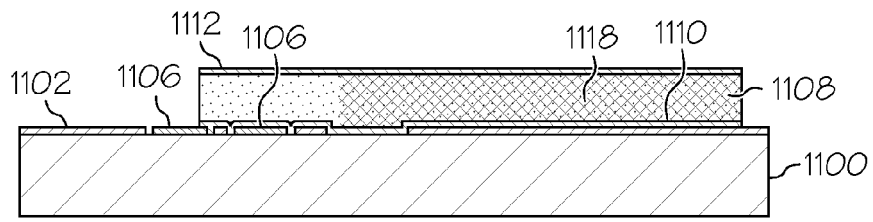

As noted above, the elastomeric layer comprises photosensitive material, and thus, when light passes through the phase mask, a three dimensional distribution of intensity is generated that exposes the photosensitive elastomeric layer throughout its thickness. For the case of a photopolymer, removing the mask and developing away the parts of the elastomeric layer that are not crosslinked by the light exposure yields a three-dimensional nanostructure in the geometry of the intensity distribution. FIG. 11 is a simplified depiction of a three-dimensional nanostructure 1118 formed in an elastomeric layer 1108 after removal of the mask, according to an embodiment. The elastomeric layer 1008, shown in FIG. 11 includes optional upper and lower conductive surface layers 1110, 1112, and is over a sacrificial layer 1102, interconnects 1106, and a sacrificial substrate 1100. In an embodiment, feature sizes of the nanostructure are in a range of about 20 nm to about 200 nm. In another embodiment, the feature sizes are smaller or larger than the aforementioned range. The proximity field nanopatterning techniques can be scaled to large areas simply by known scanning techniques. For example, spot sizes nearing 1 cm$^2$ may be formed by employing relatively inexpensive lasers and optics having an output of about 2 Watts to about 30 Watts and a focal area of about 5 cm to about 10 cm for exposure times of a few seconds. Scanning over larger areas may be achieved over a few minutes. Larger, more powerful lasers and optics can be used for scaling to extremely large areas (square meters) if desired. In another embodiment, larger areas may be exposed by rastering the sample underneath the laser. Although a scan field is divided into small elements, all the elements can be scanned in one operation over an entire area of the deposited elastomeric layer. In any case, after the elastomeric layer is exposed, the photonic crystal is formed. In another embodiment, a separate exposure of the elastomeric layer may be employed to yield the antireflective layer. In still another embodiment, a separate exposure of the elastomeric layer may be employed to form the diffractive layer.

Figure 12:
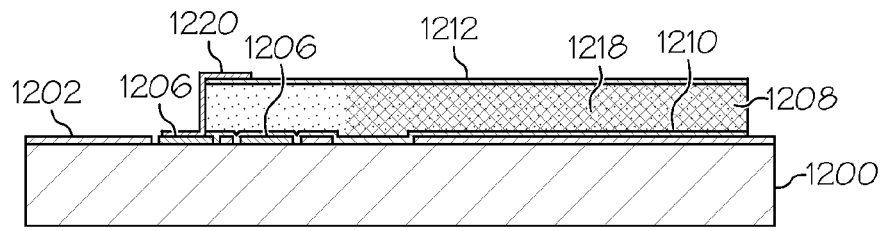

A second interconnect is formed on the photonic crystal, step 612. In an embodiment, the second interconnect is formed from the doped elastomeric layer of step 608, and selected portions of the doped elastomeric layer are masked and etched for the second interconnect. In another embodiment, the second interconnect may comprise a conductive material, including but not limited to a conductive polymer. The conductive material is formed over a portion of the conductive surface layers to provide sufficient step coverage. In an embodiment, the conductive material may be deposited on a sidewall of the photonic crystal to provide an electrical connection between the conductive surface layers and the second interconnect. In another embodiment, the conductive material is deposited over the upper conductive surface layer and on a portion of the lower conductive surface layer to provide electrical connection with the second interconnect. According to an embodiment, the conductive material may be deposited to a thickness in a range of about 10 nm to about 1000 nm. In another embodiment, the conductive material may be thicker or thinner than the aforementioned range. After the conductive material is deposited, it is patterned and etched to form the contact. FIG. 12 illustrates a second interconnect 1220 formed between conductive surface layers 1210, 1212 and a second interconnect 1206 extending along a side of the elastomeric layer 1208, which are disposed over sacrificial layer 1202 and sacrificial substrate 1200. Although a single interconnect is described as being formed in step 612, more than one interconnect may be formed concurrently or separately, in other embodiments.

The photonic crystal is transferred to a receiving substrate, step 614. In an embodiment, the receiving substrate may be a substrate including an actuator or may be another device on which the photonic structure is to be disposed. According to an embodiment, initially, a donor substrate is prepared. The donor substrate comprises a material that is capable of supporting fully formed organized arrays of the photonic structure. Undercut etching processes are performed to release the photonic structure from the sacrificial substrate. The undercut etching reduces the degree of adhesion of the photonic structure to the sacrificial substrate. A soft elastomeric stamp having a predetermined relief geometry is contacted with a surface of the photonic structure. The stamp is pulled away from the donor substrate with a peel velocity of greater than about 10 cm/sec. As a result, the photonic structure adheres to the surface of the stamp and is removed from the sacrificial substrate. The stamp is contacted with the receiving substrate, and the stamp is removed from the photonic structure with a peel velocity of about 1 mm/sec or slower. The photonic structure adheres to the receiving substrate, thereby removing it from the surface of the stamp.

Steps 602 to 612 of the above-described method 600 are employed to form a photonic structure including a single layer of cells. Multiple layers of overlapping cells can be formed by repeating method 600 one or more times. Alternatively, multiple layers of overlapping cells can be formed by building two or more single-layer arrays of cells using steps 602 to 612 on two or more substrates, then employing step 614 to transfer one array from one substrate on top of another array on its corresponding substrate.

Moreover, although step 614 may be employed to couple the actuator to the photonic crystal, the actuator is formed with the elastomeric layer using a self-aligned shadow mask to pattern all three layers together in an alternate embodiment. Additionally, although only a single elastomer block is shown in FIG. 9, additional blocks can be included on top of the first to make an antireflective layer or diffractive layer.

Improved devices and methods for displaying images have now been provided. The devices including the aforementioned photonic structures may be employed in a variety of applications and can operate using minimal power. For example, the photonic device may be implemented in reflective displays and can operate without a backlight to be more power efficient and easier to see in bright sunlight than conventional backlit displays. Additionally, a display based on a device including at least a 90% reflective photonic structure would have sufficient contrast to be viewed at dusk or by moonlight without use of an artificial light source. In another example, the photonic structure may be implemented as a changeable skin for camouflage purposes. In an embodiment, large area arrays of the photonic structure built on a flexible substrate can be used as a skin for anything from sensors to micro aerial vehicles to large vehicles including tanks. For example, an unattended ground sensor including the photonic structure may display an image that appears similar to gravel or blowing grass on which the sensor is placed. A micro-air vehicle can blend into a surface of a building that it lands on while performing surveillance operations. In still another example, the photonic structure may be employed to convey information or data. In particular, the photonic structure may be used to serve as part of a billboard. In still other applications, the photonic structure may be used as a reflector that is used in place of a dispersive element in a rugged, no-moving-parts-spectrograph. In particular, when used a tunable reflector, the photonic structure can be continuously tuned through a wavelength spectrum, rather than having to physically move or rotate a prism or grating to achieve a desired spectrum.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A photonic structure, comprising:
a three-dimensional photonic crystal comprising an elastomeric, auxetic material and configured to provide a predetermined optical bandgap, wherein the predetermined optical bandgap is a nearly complete optical bandgap and has an energy range over which ≦20% of a total number of photons can propagate within the photonic crystal; and
an actuator coupled to the three-dimensional photonic crystal and configured to compress the three-dimensional photonic crystal,
wherein when the actuator compresses the three-dimensional photonic crystal, the three-dimensional photonic crystal shifts from reflecting light in a first wavelength range to light in a second wavelength range.

2. The photonic structure of claim 1, wherein:
the actuator comprises a first actuator and a second actuator, and
the first actuator and the second actuator are disposed on opposite sides of the three-dimensional photonic crystal.

3. The photonic structure of claim 1, wherein:
the actuator comprises a segmented electrode.

4. The photonic structure of claim 1, further comprising:
an interconnect in electrical communication with the actuator to electrically couple the actuator to a voltage source.

5. The photonic structure of claim 1, further comprising:
an anti-reflective layer disposed proximate the three-dimensional photonic crystal.

6. The photonic structure of claim 1, further comprising:
a diffractive layer disposed over the three-dimensional photonic crystal.

7. The photonic structure of claim 1, wherein the elastomeric material comprises a material selected from a group consisting of photosensitive elastomer.

8. The photonic structure of claim 1, wherein a portion of the three-dimensional photonic crystal is doped with carbon particles.

9. The photonic structure of claim 1, wherein the predetermined optical bandgap is a substantially complete optical bandgap and has an energy range over which ≦10% of a total number of photons can propagate within the photonic crystal.

10. The photonic structure of claim 1, wherein the three-dimensional photonic crystal comprises a plurality of cells including a fluid.

11. The photonic structure of claim 1, wherein the three-dimensional photonic crystal is capable of reflecting light within a wavelength range of about 400 nm to about 15 μm.

12. A photonic device, comprising:
a substrate; and
a photonic structure disposed over the substrate, the photonic structure including an array of scales, wherein each scale of the array of scales comprises:
a three-dimensional photonic crystal comprising an elastomeric, auxetic material having a lattice structure capable of being compressed and configured to provide a predetermined optical bandgap, wherein the predetermined optical bandgap is a nearly complete optical bandgap and has an energy range over which ≦20% of a total number of photons can propagate within the photonic crystal, and
an actuator coupled to the three-dimensional photonic crystal and configured to compress the three-dimensional photonic crystal,
wherein when the actuator compresses the three-dimensional photonic crystal, the three-dimensional photonic crystal shifts from reflecting light in a first wavelength range to light in a second wavelength range.

13. The photonic device of claim 12, wherein:
an actuator of a first scale of the array of scales and an actuator of a second scale of the array of scales are individually tunable.

14. The photonic device of claim 12, wherein each scale includes a stem coupled to the substrate.

15. The photonic device of claim 12, wherein the array of scales are arranged in rows.

16. The photonic device of claim 12, wherein a portion of each scale in a first row overlaps a portion of each scale in a second row adjacent to the first row.

17. The photonic device of claim 12, wherein a portion of each scale in a first row overlaps a portion of an adjacent scale in the first row.

18. The photonic device of claim 12, wherein each scale of the array of scales includes an anti-reflective layer disposed proximate the three-dimensional photonic crystal.

19. The photonic device of claim 12, wherein each scale of the array of scales includes a diffractive layer disposed over the three-dimensional photonic crystal.

20. The photonic device of claim 12, wherein the predetermined optical bandgap is a substantially complete optical bandgap and has an energy range over which ≦10% of a total number of photons can propagate within the photonic crystal.

* * * * *